United States Patent [19]

Mitsutsuka et al.

[11] 4,135,970
[45] Jan. 23, 1979

[54] SYSTEM FOR DETECTING THE FAILURE OF A NUCLEAR FUEL ROD IN A NUCLEAR REACTOR

[75] Inventors: Norimasa Mitsutsuka, Yamato; Katsumi Kubo, Fujisawa; Tatsuo Miyazawa, Yokohama, all of Japan

[73] Assignee: Tokyo Shibaura Electric Co., Ltd., Tokyo, Japan

[21] Appl. No.: 772,981

[22] Filed: Feb. 28, 1977

[30] Foreign Application Priority Data

Feb. 27, 1976 [JP] Japan .................. 51-20902

[51] Int. Cl.² .......................................... G21C 17/00
[52] U.S. Cl. ............................ 176/19 LD; 176/37
[58] Field of Search ............... 176/19 LD, 37, 80; 73/40.7

[56] References Cited

U.S. PATENT DOCUMENTS

| | | | |
|---|---|---|---|
| 3,018,159 | 1/1962 | Silverman | 176/37 |
| 3,203,866 | 8/1965 | Lehmer et al. | 176/37 |
| 3,227,878 | 1/1966 | Wair et al. | 176/19 LD |
| 3,523,868 | 8/1970 | Dady | 176/19 LD |
| 3,788,942 | 1/1974 | Hyun | 176/19 LD |
| 3,817,829 | 6/1974 | Frisch et al. | 176/19 LD |
| 4,010,068 | 3/1977 | Cooper | 176/37 |

*Primary Examiner*—Verlin R. Pendegrass
*Assistant Examiner*—S. A. Cangialosi
*Attorney, Agent, or Firm*—Oblon, Fisher, Spivak, McClelland & Maier

[57] ABSTRACT

A system for detecting the failure of a nuclear fuel rod in a nuclear reactor comprises sampling a coolant in a nuclear reactor, cooling the sampled coolant to permit $135_I$ in the coolant to be adsorbed on an iodine adsorption device, moving $135m_{Xe}$ produced by the $135_I$ decay into a cover gas at the upper space of a gas-liquid separator, and introducing the $135m_{Xe}$ entrained cover gas into a radioactivity detector where the radioactivity of $135m_{Xe}$ is counted.

18 Claims, 4 Drawing Figures

SYSTEM FOR DETECTING THE FAILURE OF A NUCLEAR FUEL ROD IN A NUCLEAR REACTOR

BACKGROUND OF THE INVENTION

This invention relates to a system for detecting a breakage of a nuclear fuel rod in a nuclear reactor.

When a nuclear fuel rod disposed at the core of a nuclear reactor is damaged, a temperature distribution at the core of the nuclear reactor varies, leading to a failure of the stable operation on one occasion and a complete failure of the operation of the nuclear reactor on the other. The failure of the nuclear fuel rod leads to leakage of fission products which in turn enter into a coolant or its cover gas.

As a system for detecting failure of a nuclear fuel rod in the nuclear reactor is generally used a system for examining whether or not a fission product emitting a delayed neutron into a coolant is dissolved and a system for examining a gaseous fission product is mixed in the cover gas. However, the former system shows a poor detection sensitivity and when a failure of the nuclear fuel rod is detected there is a fear that a great damage is already been developed and in consequence undesirable result is obtained from the standpoint of securing the safety of the unclear reactor. In the latter system, it is impossible to distinguish whether a damaged portion is located, for example, in a plenum above the nuclear fuel rod or at a fuel-filling portion which exerts a groove influence over the operation of the nuclear reactor. In order to eliminate such an inconvenience the following system has been proposed. That is, the failure of the nuclear fuel rod is detected by examining the concentration of $135_I$ utilizing the phenomenon that when the fuel-filling portion of the nuclear fuel rod is failed a fission product emitting a delayed neutron leaks from the failed portion of the rod, together with the $135_I$, into a coolant.

This conventional detection system will now be explained below by referring to FIG. 1.

Reference numeral 2 shows a nuclear reactor of the type in which a coolant 6 is circulated around a core 4, and 8 a gas-liquid separator in which an inert cover gas 10 is contained. The separator 8 is adapted to temporarily retain a coolant 12 sampled from the nuclear reactor and transfer into a cover gas 10 $135m_{Xe}$ produced by decay of $135_I$ which is already contained in the coolant. The separator 8 has a first inlet 14 connected through a pump means 18 and valve 20 over a pipe 16 to the interior of the nuclear reactor and a second inlet 28 connected through a valve over a pipe 30 to a cover gas supply source, not shown. The separator 8 has a first outlet 22 connected through a valve 26 to the interior of the nuclear reactor and a second outlet 34 connected through a pipe 36 over a pipe 36 to a spent gas treating system, not shown. The cover gas 10 prevents oxidation of the coolant 12 introduced into the separator 8. The separator 8 has a third inlet 40 connected through a valve 44 over a pipe 42 to an inert gas supply system, not shown. Between the inlet 28 and the outlet 34 of the separator 8 is provided a cover gas passage, i.e., a pipe 46 over which a valve 48, pump means 50, vapor trapping means 51, radioactivity detecting means 52 and fission products trapping means 54 and valve 56. The valves 20, 26, 32, 38, 44, 46 and 56 as well as the pumps 18 and 50 are of electromagnetic type and are controlled by the outputs of a control means 58.

The above-mentioned detection system is carried out as follows:

Suppose that a cover gas is being introduced into the separator 8. When the valves 20 and 26 are opened to permit the pump means 18 to be operated, the coolant 6 is sampled from the interior of the nuclear reactor 2 and fed into the separator 4. Then, the valves 20 and 26 are closed to stop the operation of the pump 18, stopping the introduction of the coolant into the separator 8. Then, the valve 44 is opened to permit an inert gas to be introduced into the coolant 12 and $135m_{Xe}$ produced by iodine $135_I$ decay before the coolant is sampled from the nuclear reactor is transferred into the cover gas. Then, the valve 44 is closed and valves 32 and 38 are opened to permit a supply of the inert gas into the coolant 12 to be interrupted. At the same time the cover gas is introduced into the spent gas treating system for exhaust and a fresh cover gas is supplied to the separator from the cover gas supply source. Then, the valves 32 and 38 are closed to stop a supply of the cover gas. This state is maintained for a predetermined time period, permitting decay into $135m_{Xe}$ of iodine $135_I$ contained in the coolant. After the passage of a predetermined period the valve 44 is opened to permit an inert gas to be blown into the coolant 12 in the separator 8. Xenon $135m_{Xe}$ decayed from iodine $135_I$ for the above-mentioned predetermined time period is transferred into the cover gas. Then, the valve 44 is closed and valves 48 and 56 are opened to permit the pump means to be operated. The pump means 50 is operated to cause the $135m_{Xe}$-entrained cover gas to be introduced through the vapor trapping means into the radioactivity of $135_{Xe}$ is counted. The concentration of $135_I$ is proportionately measured from the intensity of radioactivity of $135m_{Xe}$ counted. Such an operation is repeated for measurement of a concentration variation of $135_I$ and the failure of the nuclear fuel rod is detected from the concentration variation of $135_I$. However, the conventional detection system has the following disadvantages:

(1) Since the detection sensitivity is determined by the amount of a coolant sampled out of the nuclear reactor, i.e., by the volume of the separator 8, a large capacity gas-liquid separator 8 is necessarily required to elevate the detection sensitivity, resulting in a bulky system.

(2) In order to enhance the detection sensitivity a large quantity of coolant is held in the gas-liquid separator and at the same time an inert gas is blown into the separator, thus producing a synergistic action to cause a larger quantity of coolant to be introduced in the vapor form into the radioactivity detecting means. Removal of the gaseous coolant makes the system complicated in construction and bulky in size.

SUMMARY OF THE INVENTION

It is accordingly the object of this invention to provide a nuclear fuel rod failure detection system which can detect a failure of a nuclear fuel rod in high sensitivity and which can provide a small-sized system construction.

According to this invention there is provided a nuclear fuel rod failure detection system comprising sampling a coolant in an nuclear reactor, introducing the sampled coolant into a cover gas-sealed gas-liquid separator, to remove xenon already mixed in the coolant, cooling the xenon-purged coolant and passing the cooled coolant through an iodine adsorption device where iodine in the coolant is adsorbed, stopping the sampling of the coolant from the nuclear reactor after a predetermined amount of coolant is passed through the adsorption device, heating the coolant in the first gas-liquid separator and iodine adsorption device, circulating the heated coolant through the first gas-liquid separator and iodine adsorption device to permit xenon produced by decay of iodine adsorbed on the iodine adsorption device to be moved into the cover gas in the first gas-liquid separator, and introducing the xenon-entrained cover gas into a first radioactivity detecting device to detect the intensity of radioactivity of xenon.

DETAILED DESCRIPTION OF THE PREFERRED EMBODIMENTS

Figure 1:
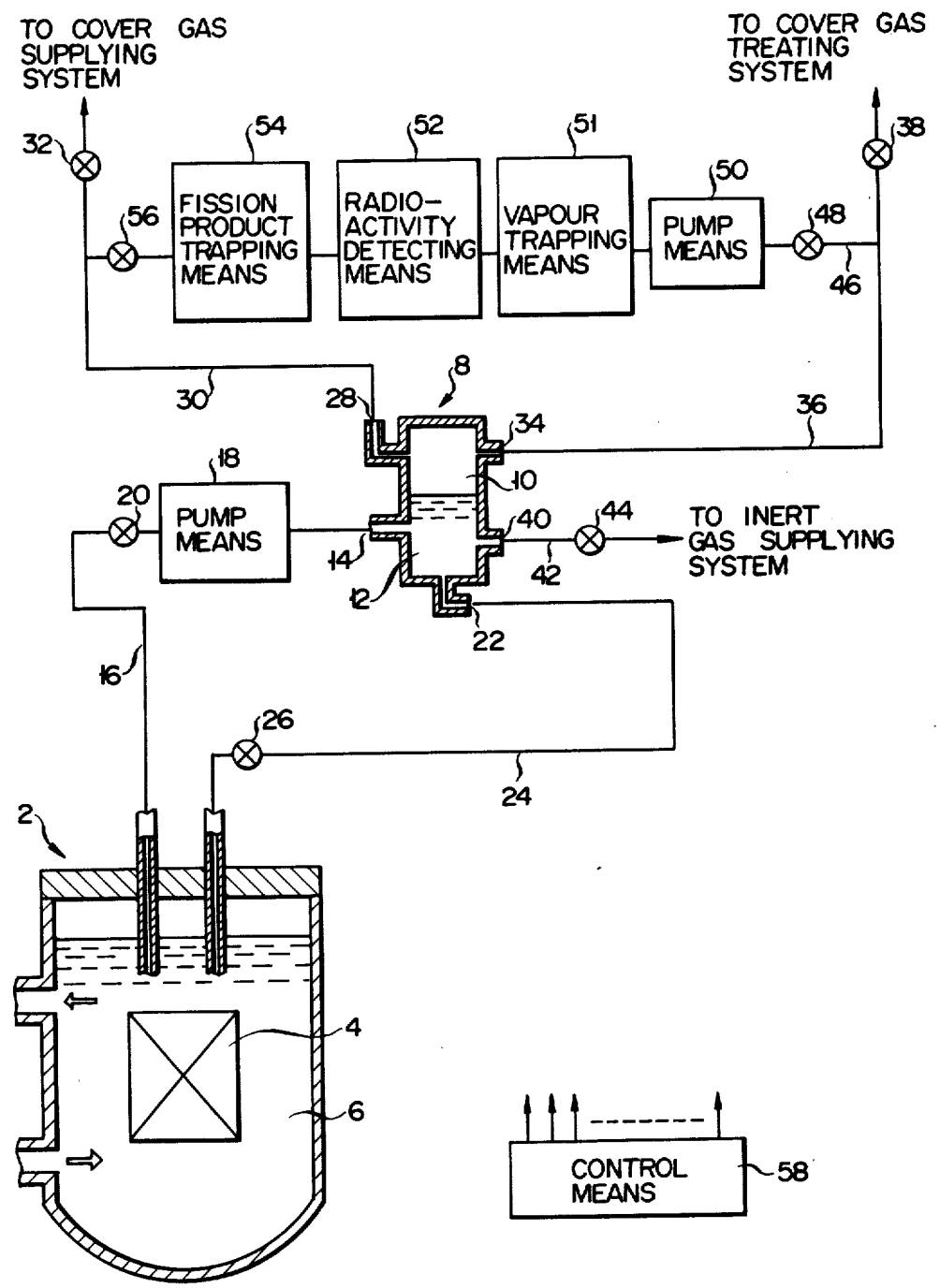
FIG. 1 is shows a conventional system for detecting the failure of a nuclear fuel rod.
Figure 2:
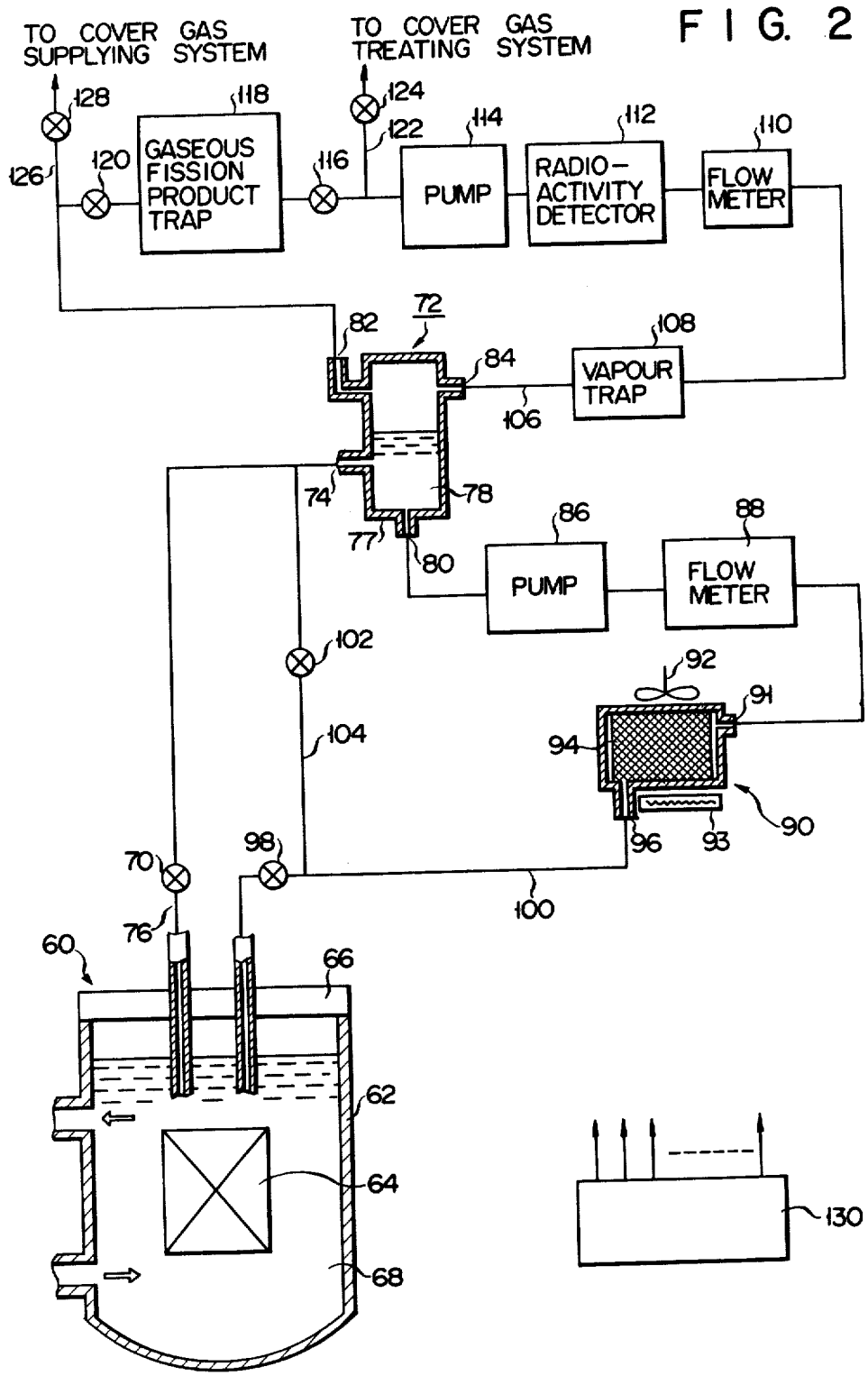
FIG. 2 shows a system, according to one embodiment of the invention, which detects the failure of a nuclear fuel rod.

In FIG. 2, a nuclear reactor 60 is, for example, a fast breeder reactor comprising a reactor container 62, a core 64 disposed within the reactor 60, a rotating plug 66 for closing the upper open end of the reactor container 62, and the other associated means, not shown. A liquid metal coolant 68, such as liquid sodium, for capturing heat evolved at the core 64 is circulated in the reactor in a direction indicated by arrows. A pipe 76 extends through the rotating plug 66 in an air-tight fashion and has one end extending into the coolant 68 and the other end connected through a valve 70 to a first inlet 74 of a gas-liquid separator 72. The gas-liquid separator 72 comprises a body 77 having the inlet 74 for introducing the coolant from the reactor 60 into the body 77, an outlet 80 provided in the bottom of the body 77 to discharge the coolant 78 in the body 77, and cover gas inlet and outlet 82 and 84 oppositely provided in the upper side walls of the body 77. The outlet 80 of the separator 72 is connected through a pump means 86 and flow meter 88 to a coolant inlet 91 of an iodine 135$_I$) adsorpting device 90. Outside of the adsorption device 90 are disposed a cooling means 92 for cooling the coolant through the adsorption device 90 to a temperature of below 200° C. and a heating means for heating the coolant through the adsorption device 90 to a temperature of above 300° C. An absorption member 94 made of an iodine adsorbing material such as stainless steel, nickel or alumina is disposed within the adsorbing device 90. The adsorption member 94 is so constructed that it has a wide contact area without blocking a free flow of the coolant through the adsorption device 90. For example, it is constructed of a mesh-like member. A coolant outlet 96 of the adsorption device 90 is connected to a pipe 100 which extends through a valve 98 and plug covering 66 into the coolant 68 in the reactor 60. The outlet 96 of the adsorption device 90 is also connected through a valve 102 to the coolant inlet 74 of the separator 72. A vapor trap 108, flow meter 110, radioactibity selector 112, pump 114, valve 116, gaseous fission product trap 118 and a valve 120 are arranged between the cover gass inlet 82 and the cover gass outlet 84. Between the pump 114 and the valve 116 is connected a pipe 122 leading to a cover gas treating system, not shown. A valve 124 is mounted over the pipe 122. A pipe 126 has one end connected to a cover gas supply system, not shown, and the other end connected to the inlet 82 of the separator 72. The pipe 126 is also connected partway to the pipe 106 leading to the valve 120 and has a valve 128. The valves 70, 98, 102, 116, 120, 124 and 128 and pumps 86 and 114 are all of an electromagnetic type and are controlled by corresponding output signals from a control device 130.

The detection system of this invention will now be described below.

Suppose that the cover gas is sealed in the separator 72 and that each valve is closed with each pump in the inoperative state. When in this case the valves 70 and 98 are opened by the control device 130 and the pump 86 and cooling means 92 are operated, the coolant 68 is raised from the reactor 60 and circulated through the valve 70, separator 72, pump 86, flow meter 88, iodine absorption device 90 and valve 98 into the reactor 60. Since the coolant 78 introduced into the separator 72 is hot (usually above 400° C.), when $135m_{Xe}$ produced by a 135$_I$ decay is included in the coolant 78 in the separator 78, $135m_{Xe}$ is transferred to the inert cover gas in the separator 72. The $135m_{Xe}$-purged coolant is introduced from the separator 72 through the pump 86 and flow meter 88 into the iodine absorption device 90. The adsorbing member 94 constituting the iodine adsorption device 90 cools the coolant introduced into the adsorption device 90 to a temperature of below 200° C. by means of the cooling means 92. Since the mesh-like adsorbing member 94 has a high cooling and high heating effect due to its large contact area, the coolant passed through the adsorbing member 94 is cooled to a temperature (below 200° C.) substantially equal to the temperature (below 200° C.) of the adsorbing member 94. When the coolant is so cooled at the adsorbing member 94, most of 135$_I$ in the coolant is adsorbed on the surface of the adsorbing member 94. Even if the adsorbed 135$_I$ is decayed into $135m_{Xe}$, it remains adsorbed on the adsorbing member 94 under a temperature of below 200° C. The coolant through the adsorbing member 94 is passed through the pipe 100 into the reactor 60. When a predetermined amount of coolant sufficient to attain a saturation adsorption state at the adsorption member 94 is passed through the adsorption member 94, the valves 70 and 98 are closed, the valves 124 and 128 are opened, and the pump 86 and cooling means 92 stop their operation. Thus, the sampling of the coolant 68 from the reactor 60 is stopped to cause a coolant flow through the separator 72, pump means 86, flow meter 88 and adsorption device 90 to be stopped. On the other hand, the $135m_{Xe}$-entrained cover gas in the separator 72 is conducted to the cover gas treating system for treatment and a fresh cover gas is supplied through the pipe 126 into the separator 72. During the treatment of the cover gass the valve 102 may be opened and the pump 86 be operated to cause the coolant in the separator 72 and adsorbing device 90 to be circulated through the pump means 86 and flow meter 88. After the passage of a predetermined time period sufficient to permit the cover gas to be cleaned, the valves 128 and 124 are closed by the control means 130, the valve 102 opened, and the pump 86 and cooling means operated.

Figure 3:
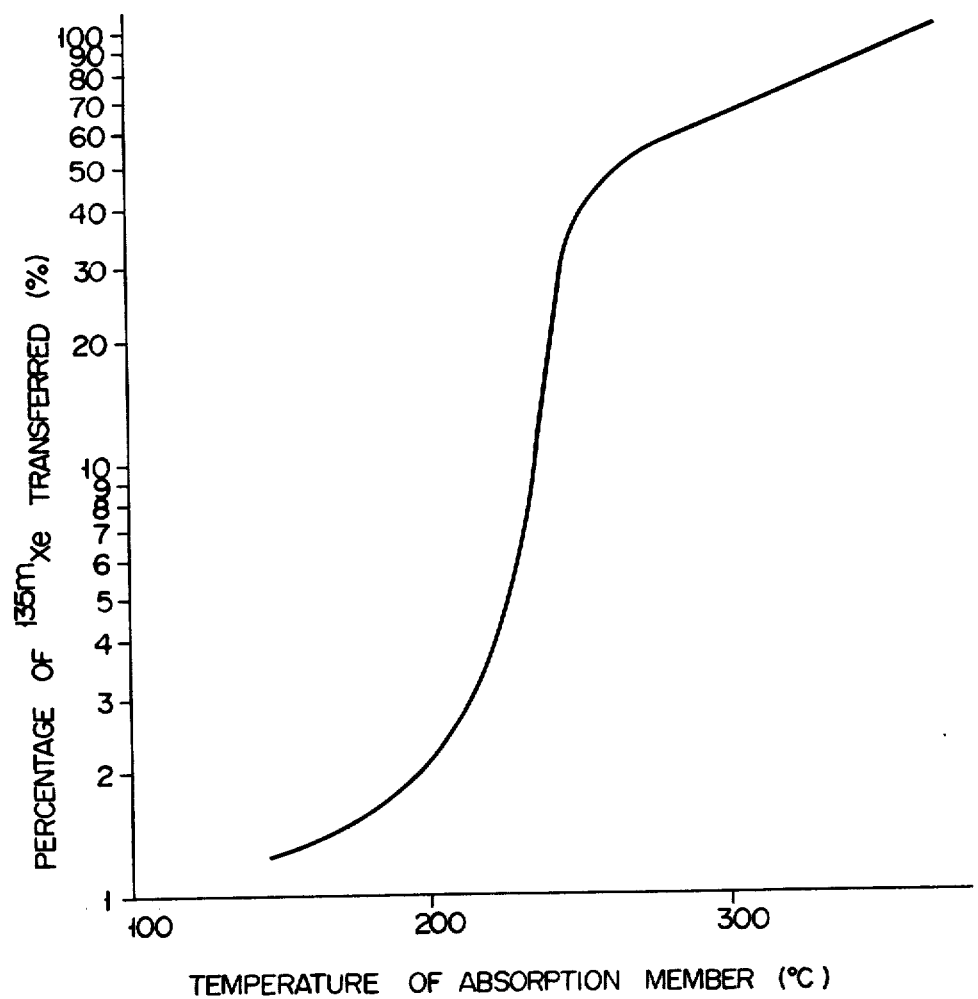
FIG. 3 is a characteristic curve showing a relation of the percentage of transferred $135m_{Xe}$ to the temperature of an adsorption member.

When the adsorption member 94 of the iodine adsorption device 90 is heated by the heating means 93 to a temperature of above 300° C., the coolant passed through the adsorption member 94 is heated to a temperature (above 300° C.) equal to the temperature of the absorbing member 94 for the same reasons as explained in connection with the cooling of the coolant. When the coolant is heated to above 300° C., most of $135m_{Xe}$ absorbed onto the absorbing member 94 is moved into the cover gas in the separator 72. This will be evident from an experimental data, indicating a relation of the temperature of the circulating coolent to the percentage of movement of $135m_{Xe}$ into the cover gas in the separator 72 (see FIG. 3). It will be apparent from FIG. 3 that when the coolant is at a temperature of below 200° C., the Xenon $135m_{Xe}$ remains absorbed with almost negligible movement of $135m_{Xe}$ into the cover gas and that when the coolant is heated to a temperature of above 300° C. a 90% $135m_{Xe}$ movement is affected into the cover gas in the separator 72. When, therefore, the coolant is circulated under a temperature of above 300° C. for a predetermined time, most of $135m_{Xe}$ produced by the decay of $135_{Xe}$ mixed in the sampled coolant is moved into the cover gas in the separator 72. Then, the valves 116 and 120 are opened and the pump 114 is operated. The $135m_{Xe}$-entrained cover gas is introduced through the vapor trap 108 and flow meter 110 into the radioactivity detector 112 where the intensity of radioactivity of $135m_{Xe}$ is detected. Then, the $135m_{Xe}$-entrained coolant is introduced through the pump 114 and valve 116 into the gaseous nuclear fission product trap 118 where $135m_{Xe}$ in the coolant is trapped. The $135m_{Xe}$-purged coolant is returned into the separator 72. When such an operation is completed, the valves 70 and 98 are opened by the control device 58, the valve 102 closed, the heating means stopped, the cooling means operated, and the coolant 68 again sampled from the reactor 60. The failure of the nuclear fuel rod is detected from the intensity variation of radioactivity of $135m_{Xe}$ as obtained from such a series of operations. Generally, the amount of adsorption, A, of $135_I$ in the coolant which is adsorbed by the adsorption device 90 can be expressed by:

$$A = KSC$$

where
  K: distribution coefficient of $135_I$
  S: surface area of the adsorption member
  C: density of $135_I$ in the coolant The distribution coefficient K of $135_I$ is the function of temperature and is increased in valve with a decrease in temperature. The distribution coefficient K of $135_I$ was examined using liquid sodium as a coolant and a mesh-like stainless steel structure as an adsorbing member 94, the result of which is as follows:

$$\text{Log } K = -5.6 + 3 \times 10^3 [1/T(K)]$$

With C representing the density of $135_I$ and the surface area S of the adsorbing member 94 it follows that for a liquid sodium temperature of 200° C., 5500cm³ of liquid sodium needs to be passed through the adsorption member 94 to reach a saturation absorption amount and for 160° C., 21000cm³ of liquid sodium. Since the system of this invention is equivalent to the sampling of a large amount of coolant from the reactor and detection of the concentration $135_I$ in the coolant, a detection accuracy can be enhanced. If the above-mentioned mesh-like structure is used as the iodine adsorption member 94, the surface area of 1000cm² can be attained by a small capacity of the order of about 200cm³, making the detection system compact as a whole.

Figure 4:
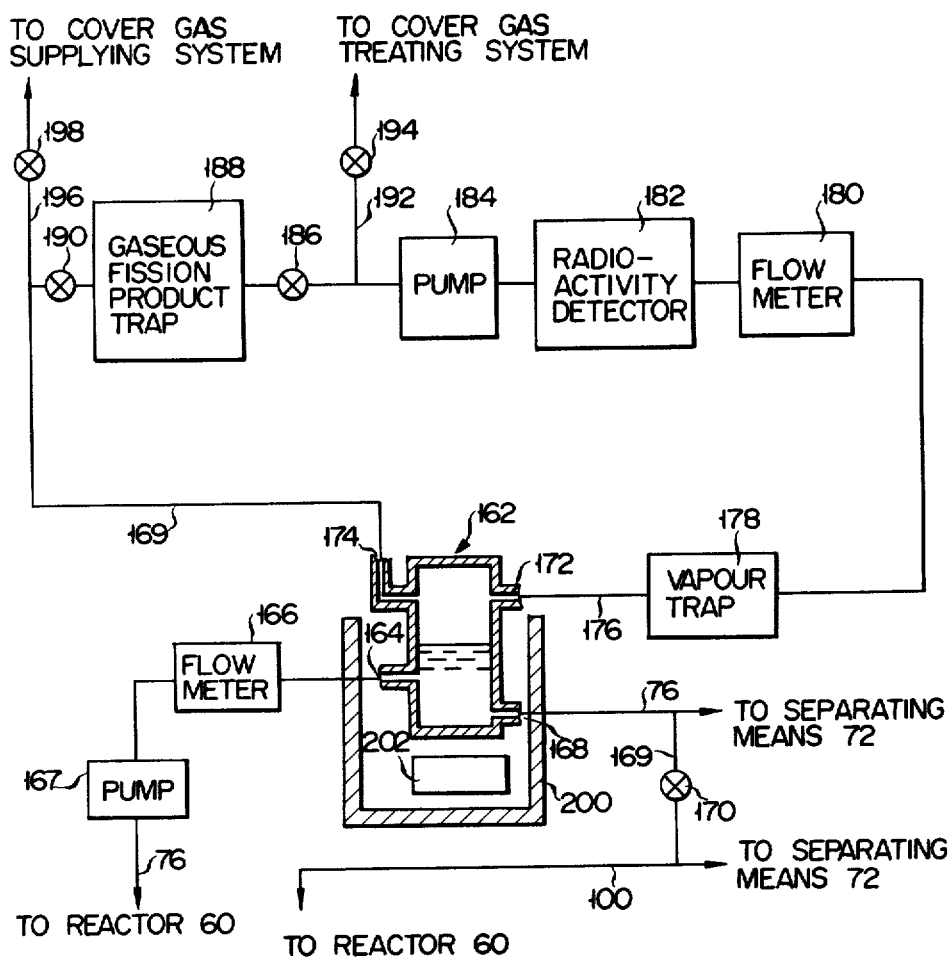
FIG. 4 shows a system according to another embodiment of the invention.

FIG. 4 shows a nuclear fuel rod failure detection system according to another embodiment of this invention. This embodiment is substantially similar to the embodiment in FIG. 2 except that a delayed-neutron/gaseous fission product detecting system 160 is provided between the atomic reactor 60 and the $135_{Xe}$ radioactivity counting system. FIG. 4 shows the delayed-neutron/gaseous fission product detecting system 160 alone, to which the following explanation is directed.

In FIG. 4 a gas-liquid separator 162 is provided having substatially the same construction as in the system in FIG. 2. The separator 162 has a coolant inlet 164 connected through a flow meter 166 and pump 167 over a pipe 76 to the reactor 60 and a coolant outlet 168 connected by a pipe 76 to the gas-liquid separator 72. Between the pipe 76 and the pipe 100 is disposed a pipe 169 by way of which the coolant flows into the pipe 100. Between a cover gas inlet 172 and a cover gas outlet 174 in the separator 162 is disposed a pipe 176 for a cover gas passage 1, on which are mounted a vapor trap 178, flow meter 180, radioactivity detector 182, pump 184, valve 186, gaseous fission product trap 188 and valve 190 in this order. Between the pump 184 and the valve 186 is connected a pipe 192 leading to a cover gas treating system (not shown) through a valve 194. Between the valve 190 and the cover gas inlet 174 is connected a pipe 196 which communicates with the pipe 176 at the valve 190 side. The pipe 196 is also connected through a valve 198 to a cover gas supply system, not shown. A neutron shielding wall member 200 is located between the separator 162 and the reactor 60, and a neutron detector 202 between the wall member 200 and the separator 162. The valves 170, 186, 190, 194 and 198 as well as the pumps 167 and 184 are electromagnetically operated by the output signals from the control device 130.

The delayed-neutron/nuclear fission product detection system of this invention will be operated as follows.

Suppose that a cover gas is sealed in the separator 162 and that each valve is closed with each pump in the in operative state. When the valves 70 and 98 (FIG. 2) are opened and the pump 167 is operated in synchronism with the operation of the pump 86 and cooling means 92, the coolant is sampled from the reactor 60 into the separator 162. Since the neutron detector 202 is disposed in the neighborhood of the separator 162, if any fission product emitting a delayed neutron is included in the coolant, the delayed neutron is detected at the neutron detector 202. Any gaseous fission product, if present in the sampled coolant, is moved into a cover gas in the upper space of the separator 162 during its stay at the separator 162. When the valves 116 and 120 are opened to permit the pump 114 to be operated, the valves 186 and 190 are opened in synchronism therewith and the pump 184 is operated, causing the cover gas to flow through the vapor trap 178, flow meter 180, radioactivity detector 182, pump 184, valve 186, gaseous fission product trap 188 and valve 190. The gaseous fission product in the cover gas has its radioactivity counted at the radioactivity detector 182. Then, the coolant present in the separator 162 is introduced into the separator 72 shown in FIG. 2. The subsequent operation is the same as that explained in connection with FIG. 2 and further explanation is omitted for gravity.

In this embodiment the occurence, mode and extent of a failure of the nuclear fuel rod are eventually detected, collectively taking into consideration the output signals from the delayed-neutron detector 202, gaseous fission product radioactivity detector 182 and $135m_{Xe}$ radioactivity detector 112. That is, signal detection only at the detector 182 means that pinholes occur in the nuclear fuel rod. When a signal is detected from the detector 112, this means that the meat of the nuclear fuel is exposed or released. When a signal is detected from the detector 202, this means that the meat of the nuclear fuel is exposed or released to a considerable extent. The extent of the fuel rod failure can be estimated from the intensity of signal. In this embodiment, not only can the damage of the fuel rod be detected in high sensitivity, but also a proper treatment can be effected as well.

The systems as shown in FIGS. 2 and 4 may be provided in large numbers with respect to the reactor and any idle time required for coolant something be eliminated by operating these systems on a time showing basis. A detection accuracy can be enhanced by varying the sampling position of an intrareactor coolant for each detection time. Where no share detection response is required, if redioactivity is counted by moving into the cover gas $135_{Xe}$ produced by $135_I$ decay, $133m_{Xe}$ and $133_{Xe}$ by $133_I$ decay, $131m_{Xe}$ by $131_I$ decay etc., detection accuracy is further enhanced. Although in the above-mentioned system liquid sodium is used as a coolant, this invention is not restricted thereto. For example, NaK, or a Na-K alloy, may be likewise used with respect to the reactor.

What we claim is:

1. A system for detecting a failure of a nuclear fuel rod in a nuclear reactor comprising the steps of (a) sampling a coolant in the nuclear reactor, (b) introducing the sampled coolant into a cover gas-sealed first gas-liquid separator to remove xenon already mixed in the coolant, (c) cooling the coolant and passing the cooled coolant through an iodine adsorption device where iodine in the coolant is adsorbed on the iodine adsorption device, (d) stopping the sampling of the coolant from the nuclear reactor after a predetermined amount of coolant is passed through the adsorption device, (e) heating the coolant in the first gas-liquid separator and iodine adsorption device, (f) circulating the heated coolant through the first gas-liquid device and iodine adsorption device to permit xenon produced by decay of iodine adsorbed on the iodine adsorbing device to be moved into the cover gas in the first gas-liquid separator, and (g) introducing the xenon-entrained cover gas into a radioactivity detection where the radioactivity of xenon is detected.

2. A system according to claim 1, in which said coolant in the step (c) is cooled to below 200° C.

3. A system according to claim 1, in which said coolant in the heating step (e) is heated to above 300° C.

4. A system according to claim 1, in which said iodine adsorption device has a mesh-like structure.

5. A system according to claim 1, in which the coolant is caused to flow through the iodine adsorption device until an adsorption saturation state is reached.

6. A system according to claim 1, in which said iodine is $135_I$.

7. A system according to claim 1, in which said iodine is $133_I$.

8. A system according to claim 1, in which said iodine is $131_I$.

9. A system according to claim 1, in which said xenon is $135m_{Xe}$.

10. A system according to claim 1, in which said xenon is $135_{Xe}$.

11. A system according to claim 1, in which said xenon is $133m_{Xe}$.

12. A system according to claim 1, in which said xenon is $133_{Xe}$.

13. A system according to claim 1, in which said xenon is $131m_{Xe}$.

14. A system according to claim 1, in which said adsorption device is made of stainless steel.

15. A system according to claim 1, in which said adsorption device is made of nickel.

16. A system according to claim 1, in which said adsorption device is made of alumina.

17. A system according to claim 1, in which the sampled coolant is, before introduced into said gas-liquid separator, introduced into another cover gas-sealed gas-liquid separator to permit a gaseous fission product in the coolant to be moved into the cover gas in the separator, and the gaseous fission product-entrained cover gass is then introduced into another radioactivity detector where the radioactivity is counted.

18. A system according to claim 1, in which before the sampled coolant is introduced into said gas-liquid separator a delayed neutron emitted from a fission product in the coolant is detected as a deloyed-neutron detector.

* * * * *